May 7, 1940.  M. C. STRINGER  2,199,897
POLE MOUNTING
Filed Dec. 2, 1938
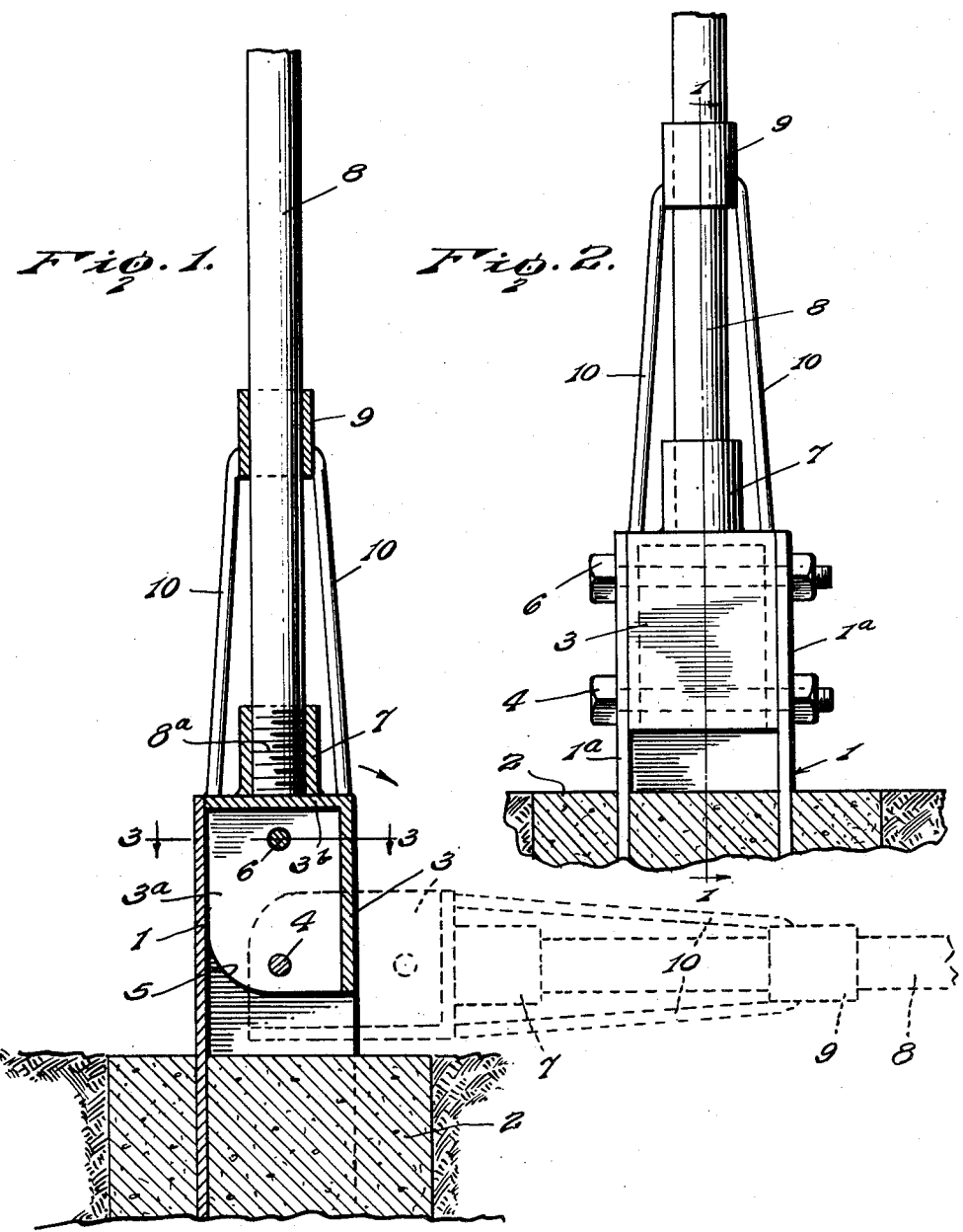
Inventor
M. C. Stringer.
By Lacey & Lacey,
Attorneys Patented May 7, 1940

2,199,897

UNITED STATES PATENT OFFICE 2,199,897

POLE MOUNTING

Montford C. Stringer, Hopedale, Ohio

Application December 2, 1938, Serial No. 243,667

2 Claims. (Cl. 189—28)

This invention relates to a pole mounting, and it is one object of the invention to provide a device of this character which will serve very effectively as a support for a pole of any specific character, such as a flag pole, light pole, sign pole, aerial pole for radios or any other specific type of pole which is to be supported in a vertical position when in use.

Another object of the invention is to so construct the mounting that the pole may be detachably mounted in a socket forming part of the mounting and thus permit the pole to be removed from the mounting when so desired.

Another object of the invention is to provide a mounting including in its construction not only a socket to receive the lower end portion of the pole but also including bracing means for the pole consisting of a sleeve or collar fitting about the pole above the pole-receiving socket and carried by struts serving as braces and preventing lateral stresses from bending the pole or breaking it at the socket.

Another object of the invention is to provide a pole mounting wherein the socket and the brace for the pole are carried by a member mounted for swinging movement from a lowered position to a raised position and adapted to be secured in the raised position by a removable fastener. It will thus be seen that, when so desired, the pole may be swung downwardly to a horizontal position in which it will rest upon the ground and appliances secured to the upper end of the pole, the pole being then swung upwardly to the raised or vertical position where it will be secured.

Another object of the invention is to so form the mounting member and the standard carrying the same that, while it may be easily swung downwardly to a lowered position in one direction when so desired, swinging movement in an opposite direction beyond a vertical position will be prevented and swinging movement either upwardly or downwardly in a direction at right angles to the movement just referred to prevented. It will thus be seen that, while the mounting member may be swung vertically to a lowered position or a raised position, it will be firmly secured and effectively braced when in the raised position and likelihood of damage due to transverse strain when in the upright position reduced to a minimum.

Another object of the invention is to provide a device of this character wherein the standard and the mounting member are both formed of angle metal of U-shaped formation in cross section, the mounting member being disposed within and straddled by the standard and cooperating therewith to form a closed structure when the mounting member and a pole carried thereby are in an upright position.

Another object of the invention is to provide a device of this character which is very strong and durable and at the same time of light weight so that the mounting and the pole carried thereby may be very easily swung to a lowered position or a raised position.

The invention is illustrated in the accompanying drawing, wherein:

Figure 1 is a view showing a pole carried by a pole mounting of the improved construction, the pole mounting being in section along the line 1—1 of Figure 2 and the lowered position of the pole being indicated by dotted lines, Figure 2 is a view showing the improved pole mounting and a pole carried thereby in elevation, the view being taken from the right of Figure 1, and Figure 3 is a transverse sectional view taken along the line 3—3 of Figure 1.

The standard 1 of this improved pole mounting consists of a bar of channeled metal which is U-shaped in cross section, as shown in Figure 3, and of such length that, when its lower portion is embedded in a base or block 2 of concrete which is set into the ground, the upper portion of the standard will project upwardly from the base. A mounting or carriage 3, which is also formed of angle metal, fits between the side walls 1ª of the standard 1 and has its side walls 3ª in close contacting engagement with the side walls of the standard, as shown in Figure 3, and its upper walls 3ᵇ flush with the upper edges of the walls of the standard when the carriage or mounting is in the raised position shown in Figure 1 and in Figure 2. A bolt 4 passes through the side walls of the standard and lower end portions of the side walls of the carriage or mounting to pivotally mount the carriage for swinging movement from the lowered position indicated by dotted lines in Figure 3 to the raised position shown in full lines therein. In order to permit this swinging movement to take place, the inner lower corner portions 5 of the side walls 3ª are cut off and formed with arcuate edges. The mounting is to be releasably secured in the raised position, and in order to do so, there has been provided a second bolt 6 which extends through the side walls of the standard and the mounting or carriage above the bolt 4. When this bolt is in place, the mounting or carriage 3 will be very firmly secured in its upright position, and since it is disposed between the side walls of the standard, it will be braced against movement longitudinally of the bolt. Upward swinging movement of the carriage beyond the vertical position shown in Figures 1 and 2 will be prevented by engagement of the inner side edges of the side walls 3ª of the carriage with the bridging wall 1ᵇ of the standard. The bridging wall of the carriage or mounting is disposed outwardly when the carriage is in the raised position to close the space between the free side edges of the side walls of the standard, and the upper wall 3ᵇ of the carriage serves as a closure for the upper end of the standard. It will thus be seen that, when the carriage is in its raised position, it will cooperate with the portion of the standard which projects upwardly from the concrete base to form a hollow structure which is entirely closed, except for the short open space between the lower edge of the bridging wall of the carriage and the upper surface of the concrete base. This will serve to prevent dirt or snow from accumulating in the standard and constituting an obstruction which would prevent downward swinging movement of the carriage. An internally threaded socket 7, which is rigidly carried by the upper wall of the carriage or mounting, extends upwardly therefrom to receive the threaded lower end portion 8ª of a pole 8 which may be of either solid or tubular formation, and in order to brace this pole, there has been provided a sleeve or collar 9 which fits snugly about the pole some distance above the socket and is carried by struts or legs 10 extending between the sleeves and the four corners of the upper wall of the carriage or mounting. These struts or legs serve not only to carry the sleeves but also constitute braces to prevent the pole from being bent or broken by side strains when subjected to the action of wind. It will thus be seen that there will be no danger of the pole being bent or broken at the upper end of the socket 7. When it is desired to remove the pole or attach appliances to its upper end, it is merely necessary to withdraw the bolt 6 and the pole and mounting or carriage 3 may then be swung downwardly to the lowered position, indicated by dotted lines in Figure 1. The pole may then be unscrewed from the socket 7 and withdrawn through the sleeve 9, after which the carriage or mounting may be returned to its vertical position and the bolt 6 replaced. It wll thus be seen that flag poles or other poles which are not in continuous use may be very easily applied to or removed from the mounting and when in use firmly supported in a vertical position. Other poles which are for permanent use may also be supported in a vertical position through the medium of the improved mounting and these poles swung downwardly to a horizontal position when appliances are to be applied to or removed from their upper ends or repairs or adjustments made to such appliances carried by the pole.

Having thus described the invention, what is claimed as new is:

1. A pole mounting comprising a standard open at its top and along one side, a carriage disposed within said standard between opposed side walls thereof and having an outer side wall closing the open side of the standard when the carriage is in a vertical position, a top wall for said carriage, a fastener passing through side walls of the standard and opposed side walls of the carriage adjacent lower ends thereof and mounting the carriage for swinging movement from a vertical position wthin the standard to a lowered and substantially horizontal position, the inner lower corner portions of the side walls of said carriage being cut off and formed with arcuate edges to permit vertical swinging movement of the carriage, a removable fastener passing through opposed side walls of the standard and the carriage to releasably hold the carriage in its vertical position, a socket extending upwardly from the top of said carriage for receiving the lower end of a pole, a bracing collar, and legs for supporting said collar above said socket in spaced relation thereto extending downwardly from the collar with their lower ends united to corner portions of the top wall of the carriage.

2. A pole mounting comprising a base, a standard embedded in and extending upwardly from said base, said standard being formed of channeled material to provide a standard U-shaped in cross section and open along one side above the base, a mounting member disposed between opposed side walls of said standard, a fastener passing through the mounting member and opposed side walls of the standard and constituting a pivot about which the mounting member may have swinging movement from a vertical position to a lowered position, a removable fastener passing through the mounting member and the opposed side walls of said standard to secure the mounting member in its raised position, a pole-receiving socket at the top of said mounting member, a collar for fitting about a pole above the socket, and legs for supporting said collar in vertically spaced relation to the socket extending downwardly from the collar in diverging relation to each other and having their lower ends united to the upper end of the mounting member.

MONTFORD C. STRINGER.